United States Patent
Jenkins et al.

(10) Patent No.: US 11,299,440 B2
(45) Date of Patent: Apr. 12, 2022

(54) BODILY REMAINS DECOMPOSITION

(71) Applicant: Verde Products Inc., Wildwood, MO (US)

(72) Inventors: Robert L. Jenkins, Wildwood, MO (US); Annette Jenkins, Wildwood, MO (US)

(73) Assignee: Verde Products Inc., Wildwood, MO (US)

(*) Notice: Subject to any disclaimer, the term of this patent is extended or adjusted under 35 U.S.C. 154(b) by 11 days.

(21) Appl. No.: 17/034,644

(22) Filed: Sep. 28, 2020

(65) Prior Publication Data

US 2021/0009484 A1 Jan. 14, 2021

Related U.S. Application Data

(62) Division of application No. 15/723,859, filed on Oct. 3, 2017, now Pat. No. 10,822,288.

(51) Int. Cl.
| | |
|---|---|
| *C05F 17/10* | (2020.01) |
| *C05F 1/00* | (2006.01) |
| *C05F 17/00* | (2020.01) |
| *B09B 3/00* | (2006.01) |
| *A62D 3/02* | (2007.01) |
| *B09B 5/00* | (2006.01) |
| *A61G 17/00* | (2006.01) |

(52) U.S. Cl.
CPC ............ *C05F 17/10* (2020.01); *A62D 3/02* (2013.01); *B09B 3/00* (2013.01); *B09B 5/00* (2013.01); *C05F 1/00* (2013.01); *C05F 17/00* (2013.01); *A61G 17/004* (2016.11); *B09B 2220/06* (2013.01)

(58) Field of Classification Search
None
See application file for complete search history.

(56) References Cited

U.S. PATENT DOCUMENTS

| | | | |
|---|---|---|---|
| 4,067,716 A * | 1/1978 | Sterrett | ............... C05F 11/00 47/9 |
| 5,206,169 A | 4/1993 | Bland | |
| 6,254,654 B1 | 7/2001 | Van Barneveld | |
| 2004/0154528 A1 | 8/2004 | Page, Jr. | |
| 2008/0134575 A1 | 6/2008 | Strand et al. | |
| 2013/0160361 A1 | 6/2013 | Keithly | |
| 2014/0323297 A1 * | 10/2014 | Harman | ............... C05F 11/02 504/101 |
| 2016/0000002 A1 | 1/2016 | Bibaud et al. | |
| 2017/0283337 A1 * | 10/2017 | Gaunt | ............... C05F 17/971 |

FOREIGN PATENT DOCUMENTS

| | | |
|---|---|---|
| JP | 2009523168 A | 6/2009 |
| KR | 20100008171 A | 1/2010 |
| WO | 2017/007697 A1 | 1/2017 |

OTHER PUBLICATIONS

European Extended Search Report for Application No. 18197796.8, dated Dec. 17, 2018, 9 pages.

* cited by examiner

*Primary Examiner* — Wayne A Langel
(74) *Attorney, Agent, or Firm* — Stinson LLP

(57) ABSTRACT

An organic composition for decomposing bodily remains including a composite mixture of compost, peat, sulfur, and gypsum. The composite mixture is configured to combine with the bodily remains to decompose the bodily remains. The combined mixture has a reduced pH for reducing the detrimental effects of the bodily remains on the environment.

12 Claims, 2 Drawing Sheets

BODILY REMAINS DECOMPOSITION

CROSS-REFERENCE TO RELATED APPLICATIONS

This application is a divisional of U.S. Ser. No. 15/723,859, filed Oct. 3, 2017, the entire content of which is incorporated herein by reference.

FIELD

The present invention generally relates to the decomposition of bodily remains. In particular, the present invention relates to a composite material for decomposing cremation and non-cremated burial remains.

BACKGROUND

Memorializing the deceased is typically done using cremation or non-cremation burial, with or without the body contained within a casket or other enclosure. Cremation is the combustion, vaporization and oxidation of cadavers to basic elements of bone and mineral fragments. The modern cremation process uses large, high-powered furnaces called cremators. The cremation process destroys all traces of organic, carbon-based matter and all bodily fluids evaporate and escape through the cremator's exhaust. The only thing remaining of the body after cremation is part of the skeletal structure containing small amounts of salts and minerals.

Cremation remains are usually placed in a container and stored as a memorial, scattered into the environment, or buried into the earth. The toxic levels of sodium and high alkalinity levels of the cremation remains can be harmful to the environment. In particular, cremation remains can damage plants and alter the soil composition when the remains are placed in or around plant life. Non-cremated remains are typically buried and can also be harmful to the environment.

SUMMARY

In one aspect, an organic composition for decomposing bodily remains generally comprises a composite mixture of compost, peat, sulfur, and gypsum. The composite mixture is configured to combine with the bodily remains to decompose the bodily remains. The combined mixture has a reduced pH for reducing the detrimental effects of the bodily remains on the environment.

In another aspect, a method of making an organic composition for decomposing bodily remains generally comprises mixing together a composite mixture including compost, peat, sulfur, and gypsum. The composite mixture is configured to combine with the bodily remains to decompose the bodily remains. The combined mixture has a reduced pH for reducing the detrimental effects of the bodily remains on the environment.

In one embodiment, the composite mixture is aged for a period of time to facilitate the growth of bacteria for use in decomposing the bodily remains.

In yet another aspect, a method of treating bodily remains for decomposing the bodily remains generally comprises mixing together a composite mixture including compost, peat, sulfur, and gypsum. Adding a prescribed amount of the composite mixture to a prescribed amount of the bodily remains such that the composite mixture combines with the bodily remains to decompose the bodily remains. The combined mixture has a reduced pH for reducing the detrimental effects of the bodily remains on the environment.

BRIEF DESCRIPTION OF THE DRAWINGS

Corresponding reference characters indicate corresponding parts throughout the drawings.

DESCRIPTION OF THE PREFERRED EMBODIMENTS

Figure 1:
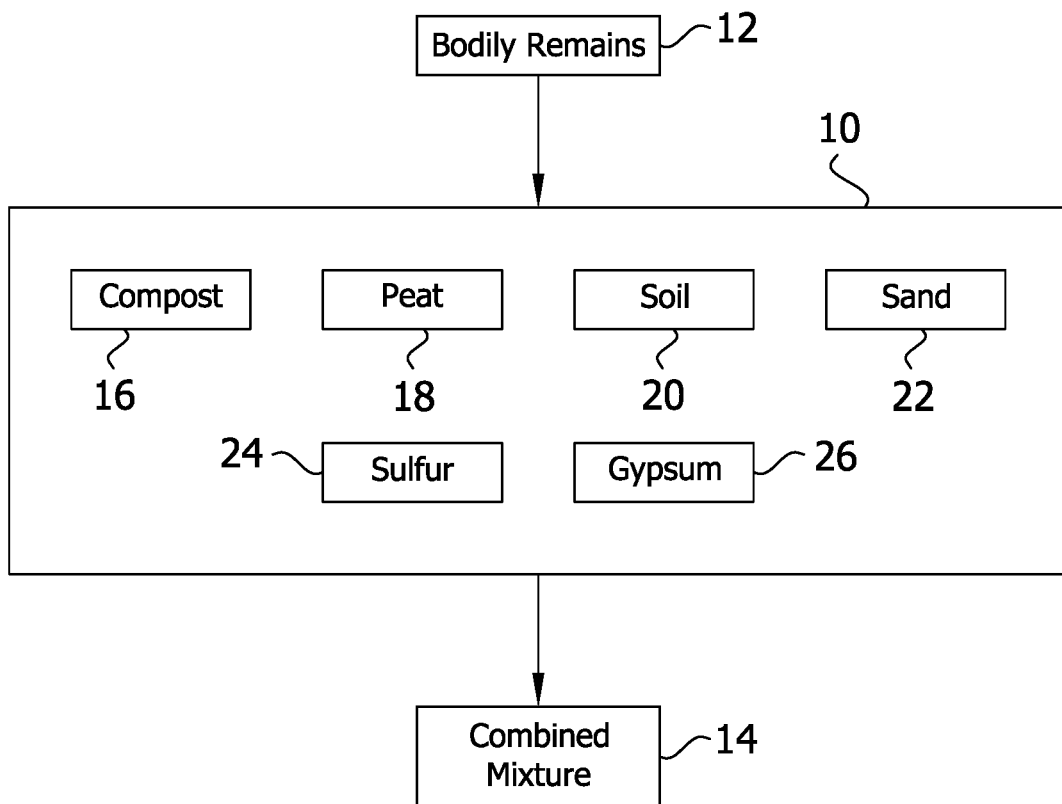
FIG. 1 is a schematic illustration of a process of combining a composite material with bodily remains for decomposing the bodily remains.

Referring now to the drawings, FIG. 1 illustrates an organic composite mixture 10 configured for breaking down bodily remains 12 (e.g., cremation and non-cremated burial remains) to reduce any detrimental effects the remains may have on the environment. In one embodiment, the composite mixture 10 is used to decompose cremation remains. The composite mixture 10 mixes with the bodily remains 12 to produce a combined mixture 14 having a reduced pH as compared to the pH of the bodily remains prior to being mixed with the composite mixture. For example, the pH of bodily remains, such as cremation remains, may be between about 10 and 12. Adding the composite mixture 10 to the remains 12 can produce a pH of the combined mixture 14 of about 7 or less. In one embodiment, the pH of the combined mixture 14 is less than about 6.8. In one embodiment, the pH of the combined mixture 14 is about 3. Reducing the pH reduces the alkalinity of the combined mixture 14 making the mixture less harmful to the environment. Adding the composite mixture 10 to the bodily remains 12 also dilutes the sodium levels of the remains making the remains less toxic. Thus, the combined mixture 14 is significantly more conducive to promoting plant growth than the bodily remains 12 prior to treatment with the mixture 10. The composite mixture 10 can be used for the decomposition of human or pet remains. In one embodiment, the composite mixture is 100% organic.

In the illustrated embodiment, the composite mixture 10 comprises a combination of compost 16, peat 18, soil 20, sand 22, sulfur 24, and gypsum 26. The compost 16 may include leaf compost, lawn waste, or any other suitable compost material. The composite mixture 10 could have additional components not mentioned, or only some of the components mentioned, without departing from the scope of the disclosure. A prescribed amount of the mixture 10 is combined with a prescribed amount of bodily remains 12 so that the mixture can effectively decompose the remains. In one embodiment, about 1 part of remains 12 is mixed with about 10 parts of composite mixture 10 to accomplish the desired level of decomposition of the remains. For example, when storing the remains 12 in a pot or container it may be desirable to use the 1 to 10 ratio. However, other ratios can be used without departing from the scope of the disclosure. In one embodiment, about 1 part remains 12 are mixed with about 1 part composite mixture 10. For example, when burying or scattering cremation remains it may be desirable to use about a 1 to 1 ratio of remains 12 to composite mixture 10. However, other ratios can be used without departing from the scope of the disclosure.

The composite mixture 10 can comprise between about 30% and about 70% compost, between about 20% and about 50% peat 18, between about 5% and about 10% sand 22, between about 5% and about 10% soil 20, between about 0.01% and about 1.0% gypsum 26, and about 5 lbs/50 cubic yards of sulfur 24. In one embodiment, the composite mixture 10 comprises about 50% peat 18, about 35% compost 16, about 10% soil 20, about 5% sand 22, about 0.01% gypsum 26, and about 5 lbs/50 cubic yards of sulfur 24. Other percentages for each component are envisioned without departing from the scope of the disclosure. The inclusion of sulfur 24 and gypsum 26 into the composite mixture 10 work to reduce the pH and dilute the sodium levels when the composite mixture 10 is combined with the bodily remains 12. The sand 22 reduces compaction of the combined mixture 14 which is advantageous in the decomposition process. Depending on the amount of bodily remains 12, the composite mixture 10 may take up to about 3 months to break down the bones of the remains when the combined mixture 14 is not buried. It will be understood that the decomposition time may vary depending on the bodily remains 12 and the manner in which the remains are held.

The composite mixture 10 can be aged prior to being combined with the bodily remains 12 to facilitate growth of bacteria that is useful in decomposing the bodily remains. In one embodiment, the composite mixture 10 is aged outside such that the composite mixture is exposed to the surrounding environment during the aging process. Thus, the aging process may be dependent on the environment in which the mixture is aged. For example, a lower ambient temperature may produce a higher internal combustion temperature within the composite mixture 10 which in turn facilitates the aging process. In addition, a humid environment may enhance aging. In one embodiment, the composite mixture 10 is aged for at least about 3 months. In one embodiment, the composite mixture 10 is aged for about 6 to about 24 months. During the aging process, the composite mixture 10 can be stirred or turned regularly to facilitate the growth of the bacteria. In one embodiment, the composite mixture 10 is stirred at least once per month. Stirring the composite mixture 10 can accelerate the aging process. For instance, in certain environments, aging may take only about 6 weeks when the mixture is stirred. The mixture 10 can be aged for a different duration or time and/or stirred at a different rate without departing from the scope of the disclosure.

Figure 2:
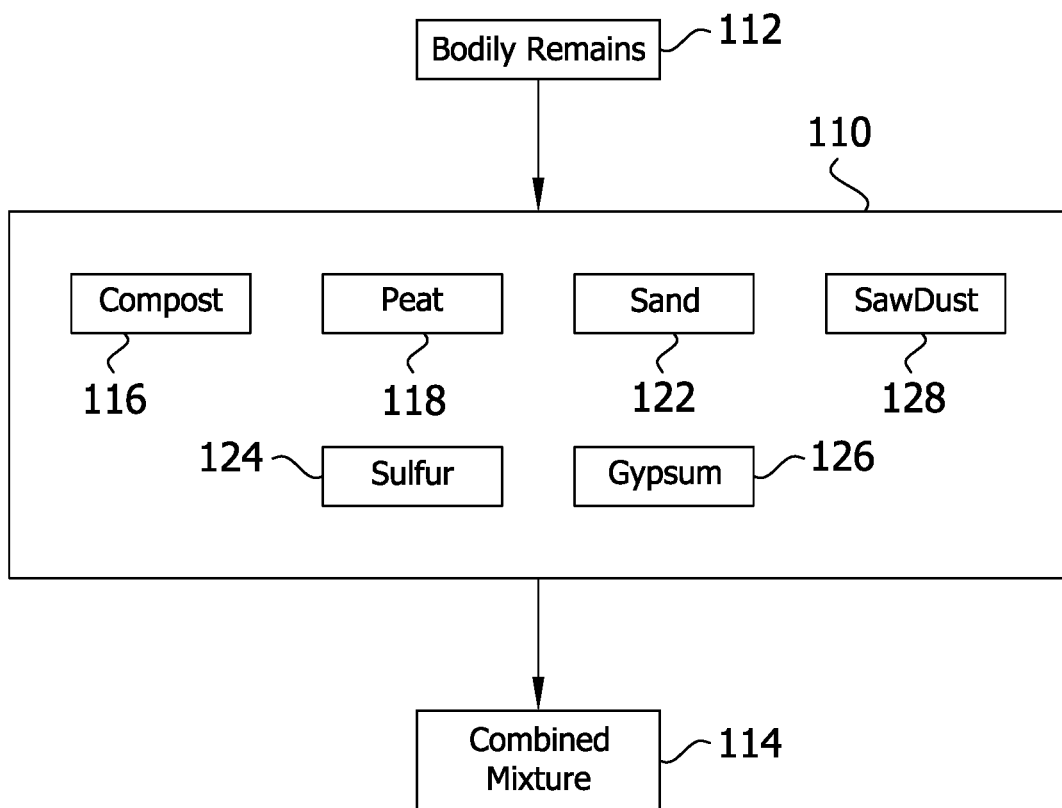
FIG. 2 is a schematic illustration of a process of combining another composite material with bodily remains for decomposing the bodily remains.

Referring to FIG. 2, an organic composite mixture of another embodiment is indicated generally at 110. The composite mixture 110 is configured for breaking down bodily remains 112 (e.g., cremation and non-cremated burial remains). In one embodiment, the composite mixture 110 is used to decompose non-cremated burial remains. The composite mixture 110 comprises a combination of compost 116, peat 118, sand 122, saw dust 128, sulfur 124, and gypsum 126. The composite mixture 110 could have additional components not mentioned, or only some of the components mentioned, without departing from the scope of the disclosure. A prescribed amount of the mixture 110 is combined with a prescribed amount of bodily remains 112 so that the mixture can effectively decompose the remains. In one embodiment, one non-cremated human or pet bodily remains 112 are mixed with a relatively proportioned amount of composite mixture 110 to accomplish the desired level of decomposition of the remains. The amount of composite mixture 110 depends on the size of the body. At a natural burial site, a portion of the composite mixture 110 would be layered in the bottom of the grave site and then another portion of the mixture would be layered above the body. The rest of the grave would be filled with soil. The composite mixture 110 can be applied to the bodily remains 112 in other ways without departing from the scope of the disclosure.

The composite mixture 10 can comprise between about 30% and about 70% compost 116, between about 20% and about 50% peat 118, between about 5% and about 10% sand 122, between about 5% and about 20% saw dust 128, between about 0.01% and about 1.0% gypsum 126, and about 5 lbs/50 cubic yards of sulfur 124. In one embodiment, the composite mixture 110 comprises about 20% peat 118, about 65% compost 116, about 5% sand 122, about 10% saw dust 128, about 0.01% gypsum 126, and about 5 lbs/50 cubic yards of sulfur 124. Other percentages for each component are envisioned without departing from the scope of the disclosure. Just as in the first embodiment, the inclusion of sulfur 124 and gypsum 126 into the composite mixture 110 work to reduce the pH and dilute the sodium levels of the combined mixture 114 when the composite mixture 110 is combined with the bodily remains 112. Also, the sand 122 reduces compaction of the combined mixture 114 which is advantageous in the decomposition process. Sawdust is used to enhance the growth of aerobic bacteria.

When introducing elements of aspects of the invention or the examples and embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description enables one skilled in the art to make and use the invention, and describes several examples, embodiments, adaptations, variations, alternatives and uses of the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various examples and embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method of treating bodily remains for decomposing the bodily remains, the method comprising:
   mixing together a composite mixture including compost, peat, sulfur, and gypsum; and
   adding a prescribed amount of the composite mixture to a prescribed amount of the bodily remains such that the composite mixture combines with the bodily remains to decompose the bodily remains, the combined mixture having a reduced pH for reducing the detrimental effects of the bodily remains on the environment.

2. The method of claim 1, wherein the combined mixture has a pH that is reduced from a pH of the bodily remains prior to being combined with the composite mixture.

3. The method of claim 2, wherein the combined mixture has a pH equal to or less than about 7.

4. The method of claim 1, wherein the bodily remains comprise one of cremation and non-cremated burial remains.

5. The method of claim 1, wherein the bodily remains comprise human or pet remains.

6. The method of claim 1, wherein the composite mixture comprises between about 30% and about 70% compost, between about 20% and about 50% peat, between about 0.01% and about 1.0% gypsum, and about 5 lbs of sulfur per 50 cubic yards of compost.

7. The method of claim 1, wherein the composite mixture further comprises soil and sand.

8. The method of claim 7, wherein the composite mixture comprises between about 5% and about 10% soil and between about 5% and about 10% sand.

9. The method of claim 1, wherein the mixture comprises about 35% compost, about 50% peat, about 0.01% gypsum, and about 5 lbs of sulfur per 50 cubic yards of compost.

10. The method of claim 9, wherein the mixture further comprises about 10% soil and about 5% sand.

11. The method of claim 1, wherein the mixture comprises about 65% compost, about 20% peat, about 0.01% gypsum, and about 5 lbs of sulfur per 50 cubic yards of compost.

12. The composition of claim 11, wherein the mixture further comprises about 5% sand and about 10% saw dust.

* * * * *